United States Patent [19]

Charles C. Lucas

[11] Patent Number: 4,682,720

[45] Date of Patent: Jul. 28, 1987

[54] GUN RACK

[76] Inventor: Charles C. Lucas, Rte. 7, Box 362, Meridian, Miss. 39301

[21] Appl. No.: 787,992

[22] Filed: Oct. 16, 1985

Related U.S. Application Data

[63] Continuation of Ser. No. 687,824, Feb. 19, 1985, abandoned.

[51] Int. Cl.⁴ ............................................. B60R 7/00
[52] U.S. Cl. ...................................... 224/311; 211/64
[58] Field of Search .................. 211/64, 86; 280/756, 280/762, 727; 224/913, 322, 311

[56] References Cited

U.S. PATENT DOCUMENTS

| | | |
|---|---|---|
| 1,227,516 | 5/1917 | Yelinek . |
| 2,535,564 | 12/1950 | Campbell . |
| 2,797,033 | 6/1957 | Rasbach . |
| 2,823,808 | 2/1958 | Hindi . |
| 3,167,182 | 1/1965 | Calvin . |
| 3,282,484 | 11/1966 | Jerore . |
| 3,294,247 | 12/1966 | Norrington . |
| 4,120,436 | 10/1978 | Burch . |

Primary Examiner—Ramon S. Britts
Assistant Examiner—Blair M. Johnson
Attorney, Agent, or Firm—Pravel, Gambrell, Hewitt, Kimball & Krieger

[57] ABSTRACT

A removable gun rack particularly suitable for placement on roll-bars of flexible type top vehicles, the rack including first and second vertical frame portions disposed in parallel relationship, said vertical frame portions held in parallel relationships via a horizontally disposed frame portion intersecting said vertical frame portions, and providing the principal frame work for the rack itself. Each vertical frame portion on its upper end loops rearwardly to provide a means for securing onto the tranverse portion of a roll-bar, and said horizontal frame portion in that area extending beyond the vertical frame portions loops rearwardly to provide a second means for securing around each vertically disposed portion of the roll-bar, so that the loops secured onto the lateral roll-bar and loops secured onto both vertically disposed roll-bars serve to secure the rack onto the roll-bar itself.

2 Claims, 3 Drawing Figures

GUN RACK

This is a continuation of U.S. patent application entitled "Roll-Bar Gun Rack", filed on Feb. 19, 1985 by Charles C. Lucas, bearing U.S. Ser. No. 687,824, abandoned.

BACKGROUND OF THE INVENTION

1. Field of the Invention

The present invention relates to gun racks. More particularly, the apparatus of the present invention relates to a gun rack particularly designed for slidable placement onto a roll-bar on the vehicle without being secured by bolts, screws or the like.

2. General Background

In the field of racks so designed for accommodating a weapon length-wise, many gun racks are so designed for placement along the back or back window of the vehicle such as a truck, land-cruiser, or the like. These types of gun racks are suitable for carrying weapons during transport of the weapon. However, as is in the case in all of the gun racks designed for use in vehicles, the gun racks usually are mounted through screws, bolts or the like onto the frame of the truck as a first piece, and the gun-support portion being mounted onto the rack as a second piece. This is a suitable mounting for that particular type of vehicle.

However, often times vehicles such as jeeps which have a flexable and collapsable top portion, are reinforced by a "roll-bar", which is a continuous U shaped piece of structural piping which is secured onto across the top and side of the vehicles in the event that the vehicle should overturn, the passengers would not be crushed in the underside of the vehicle. However, there has been no "roll-bars" so designed that would suitably accommodate a gun rack onto the "roll-bar" without having to place permanent fixtures such as screws or the like within the roll-bar itself, which would be quite a task in addition to perhaps weakening the structural integrity of the roll-bar were one to drill holes in the walls of the roll-bar.

Several patents are found in the art which address the subject matter of gun racks, the most pertinent being as follows:

| Patent No.: | Inventor: | Title: |
| --- | --- | --- |
| 2,823,808 | E. Hindi | "Rifle Rack" |
| 3,167,182 | C. A. Calvin | "Gun Rack and Method of Manufacture Thereof" |
| 1,227,516 | E. E. Yelnick | "Detachable Close Rack For Opra Chairs" |
| 3,294,247 | N. E. J. Norrington | "Adjustable Rifle Rack" |
| 2,797,033 | M. J. Rasbach | "Portable Knock Down Gun Rack" |
| 4,120,436 | D. L. Burch | "Gun Rack For A Vehicle" |
| 3,282,484 | A. L. Jerore | "Car Top Carrier" |
| 2,535,564 | E. M. Cambell | "Automobile Supporting Rack For Firearms And The Like" |

SUMMARY OF THE PRESENT INVENTION

The apparatus of the present invention solves the shortcomings in the art in a simple and straightforward manner. What is provided is a removable gun rack particularly suitable for placement on roll-bars of flexible top vehicles, the rack including first and second vertical frame portions disposed in parallel relationship, said vertical frame portions held in parallel relationship, a horizontally disposed frame portion intersecting said vertical frame portions, and providing the principal frame work for the rack itself. Each vertical frame portion on its upper end loops rearwardly to provide a means for securing onto the tranverse portion of a roll-bar, and each horizontal frame portion in that area extending beyond the vertical frame portions loops rearwardly to provide a second means for securing around each vertically disposed portion of the roll-bar, so that the loops secured onto the lateral roll-bar and loops secured onto both vertically disposed roll-bars define a means to secure the rack onto the roll-bar itself.

There is further provided means extending outwardly from the vertical frame for accommodating a rifle or the like horizontally disposed, and there is further provided means on each end portion of the vertically and horizontally disposed loop portions for securing the loop around the body of the roll-bar.

Therefore, it is an object of the present invention to provide a gun rack which is constructed of single frame work particularly suitable for placement upon a roll-bar of a vehicle;

It is still a further object of the present invention to provide a gun rack suitable for placement on roll-bars where the gun rack can be simply slipped onto the roll-bar and secured thereto via loop portions of the end of the frame work;

It is still a further object of the present invention to provide a roll-bar gun rack which can be placed onto and off of the roll-bar without the use of screws or other attachment means unrelated to the rack itself.

DESCRIPTION OF THE PREFERRED EMBODIMENT

Figure 1:
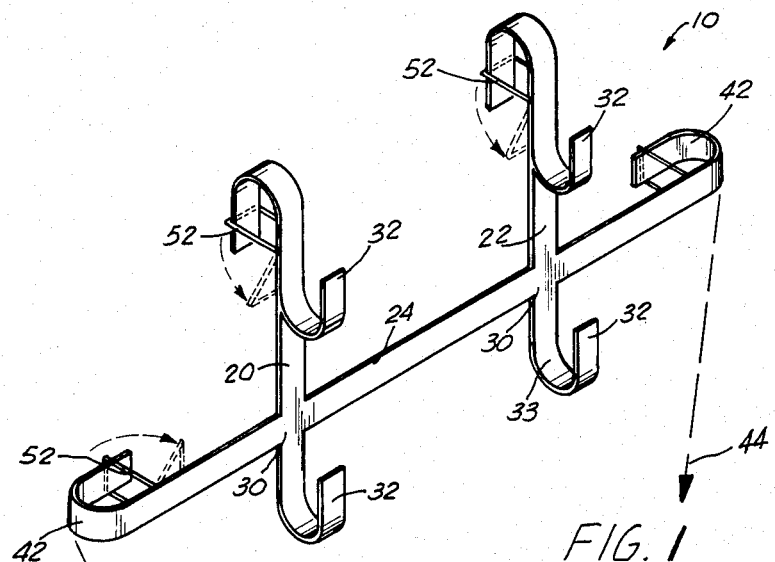
FIG. 1 is an overall perspective view of the roll-bar gun rack illustrating in phantom the rack as it is being positioned onto a roll-bar of a vehicle.
Figure 2:
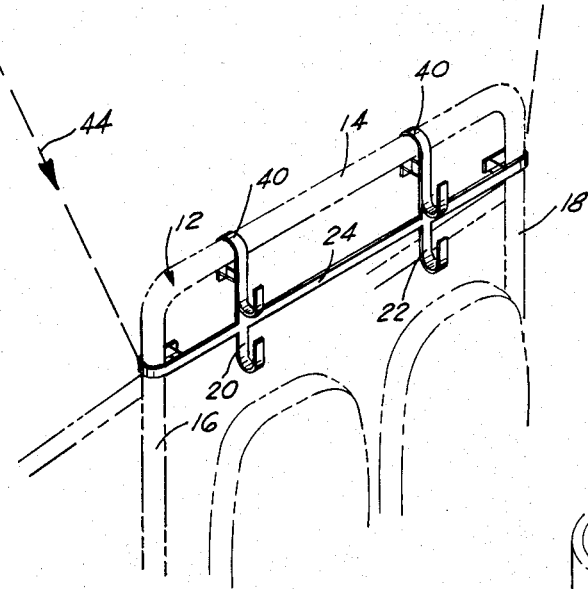
FIG. 2 is a side view of the roll-bar gun-rack positioned onto a vehicle roll-bar.
Figure 3:
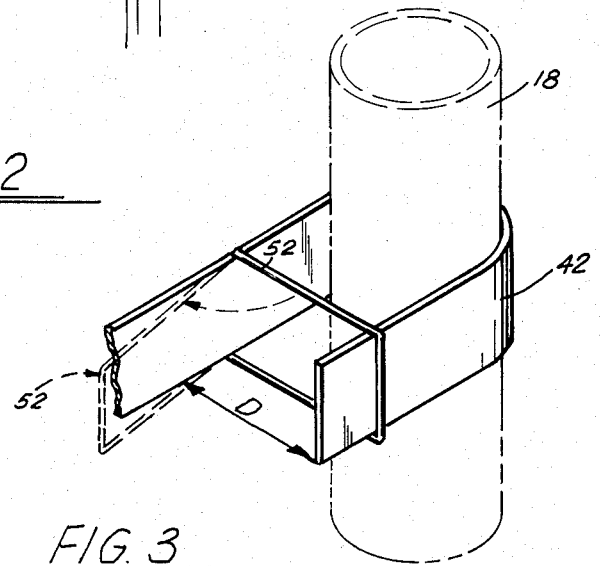
FIG. 3 is a isolated view of the attachment mechanism of the gun rack onto the roll-bar itself.

The preferred embodiment of apparatus of the present invention is illustrated by the numeral 10. Roll-bar gun rack 10 is illustrated in FIG. 1 secured onto the roll-bar of a vehicle such as a truck, jeep, or the like. The roll-bar 12 as seen in the Figures comprises a substantially horizontal portion 14 intermediate vertical side portions support portions 16 and 18, the portions 14, 16, and 18 defining the overall roll-bar mounted onto the vehicle.

As seen in the Figure, apparatus 10 comprises first and second vertically disposed frame portions 20 and 22 which are constructed of a flexible flat metal steel or the like, in parrallel relationship and positioned intermediate support portions 16 and 18 of roll-bar 12. Gun rack 10 further includes a horizontally disposed frame portion 24 rigidly conformed to vertical portions 20 and 22 at intersection 30 so that each of frame portions 20 and 22 respectively are maintained in parallel vertical relationship. As seen in the Figures, gun rack 10 further provides a plurality of weapon mounting means 32 which generally comprise a standard upward depending hook member 33 for positioning a weapon between the body of the hook member 33 and the back of the gun rack 10, in horizontal relationship.

As seen further in the Figures, gun rack 10 is secured onto roll-bar 14 or 12 via the unique mounting fashion which includes a rearward depending loop portion 40 which defines a semi-circle loop substantially having an inner diameter "D" equal to the diameter of a roll-bar 12, so that placement of the loop portion upon roll-bar 12 provides a firm and secure loop around the body of roll-bar 12 for securing thereto. Likewise, said horizontally disposed frame member 24 likewise includes loops 42 which are disposed around the vertical support portions 16 and 18 of roll-bar 10 for providing secured attachment to the roll-bar for eliminating any side movement of the gun-rack 10 while in position. In the particular roll-back as illustrated, the gun-rack 10 can simply be slid onto the roll-bar as illustrated by ARROWS 44, and the gun rack 10 is in secured position upon the upper loops 40 fitting securely around the horizontal disposed portion 14 of roll-bar 12.

Further, there is provided an alternative means for maintaining the gun rack in position onto the roll-bar other than through securing the loop 40 and 42 around the body of the roll-bar. This means would include a flexible member 52 extending from the vertically disposed frame 20 and 22 onto the end portion of the loop 40 around the underside of the roll-bar for holding the loop in position on the roll-bar through its underside. Likewise, the same type of attachment means would be provided on loops 42 extending from the end portion of loops 42 onto the horizontal disposed frame 24 as seen in the Figures.

In the preferred embodiment, so as to reduce any wear on the roll-bar or any substantial noise between the contact of the roll-bar and the gun rack, the entire vertical and horizontal frame work of the roll-bar 12 would be provided with a rubber or flexible coating so that in addition to it being a sound reducing means, it would serve to throughly frictionally engage the loops 40 and 42 around the roll-bar 12 so as to further reduce the possibility of shifting or movement of the rack during transport of the weapons.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A gun rack particularly suitable for placement onto a roll bar of a vehicle, the roll bar having at least a horizontally disposed roll member supported intermediate a pair of vertically disposed support members, the gun-rack comprising:
   a. a pair of rigid, vertically disposed frame members in parallel relation and extending to a distance upward at least to the height of the horizontally disposed roll member of the roll bar, each frame member having an upper end;
   b. at least one rigid horizontally disposed mounting member intersecting and secured between and to the vertically disposed frame members, and having ends which extends out beyond each respective vertically disposed frame member a distance at least to each vertically disposed support member of the roll bar;
   c. loop means contained on each end portion of the horizontally disposed frame member for loopingly engaging around each vertically disposed support member of the roll-bar, said loop means comprising a hook having an end formed on each respective horizontal member end;
   d. loop means contained in the upper ends of the vertically disposed frame members for loopingly engaging the horizontally disposed roll member and supporting the gun rack therefrom, said loop means comprising a hook having an end formed on each respective upper end;
   e. attachment means engaged on the end of the horizontally disposed member and comprising a hinge which allows it to pivot to the end of the hooks when the attachment means is in a first closed position and to disengage the ends of the hooks when the attachment means is in the open position; and
   f. means extending from the vertically disposed frame member for mounting a weapon thereupon; and g. means for supporting guns.

2. The apparatus in claim 1, wherein the the gun rack is encased in a flexible material such as rubber or plastic.

* * * * *